United States Patent
Rosenlof et al.

(10) Patent No.: US 7,379,514 B2
(45) Date of Patent: May 27, 2008

(54) PHASE ADVANCE COMPENSATION FOR MIMO TIME-SWITCH PREAMBLE MODES

(75) Inventors: John R. Rosenlof, LaMesa, CA (US); Kirupairaj Asirvatham, Escondido, CA (US); Srikanth Gummadi, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 568 days.

(21) Appl. No.: 11/046,085

(22) Filed: Jan. 28, 2005

(65) Prior Publication Data

US 2006/0171488 A1    Aug. 3, 2006

(51) Int. Cl.
*H04L 27/06* (2006.01)
(52) U.S. Cl. ................................... 375/340
(58) Field of Classification Search .............. 375/267, 375/340, 347, 349, 346, 351, 362, 365, 366; 700/53; 455/101, 132–141, 63, 63.1; 370/203, 370/208, 210, 338
See application file for complete search history.

(56) References Cited

U.S. PATENT DOCUMENTS

| | | | |
|---|---|---|---|
| 6,504,506 B1 * | 1/2003 | Thomas et al. | 342/383 |
| 2002/0145971 A1 * | 10/2002 | Cho et al. | 370/208 |
| 2005/0122895 A1 * | 6/2005 | Zhou et al. | 370/210 |
| 2005/0129135 A1 * | 6/2005 | Kim | 375/260 |
| 2005/0141658 A1 * | 6/2005 | Tanaka et al. | 375/346 |

OTHER PUBLICATIONS

Kim et al. A Novel Residual Carrier Synchronization Technique for M-QAM-OFDM in the Presence of Intercarrier Interference 2003, IEEE, p. 232-233.*
Egashira et al. Improvement of CCI Compensation Accuracy Using Feedback Phase Tracking in MIMO-OFDM Systems, 2004, IEEE, p. 923-927.*
Mody et al. Receiver Implementation for a MIMO OFDM System, 2002, IEEE, p. 716-720.*

* cited by examiner

*Primary Examiner*—Sam K Ahn
(74) *Attorney, Agent, or Firm*—Steven A. Shaw; W. James Brady; Frederick J. Telecky, Jr.

(57) ABSTRACT

A communications receiver is provided that includes a first and second compensators a pilot tracker and a demodulator. The first compensator is operable to adjust an input signal based on both a coarse frequency offset and a fine frequency offset to produce an adjusted input signal. The pilot tracker determines an estimated residual frequency offset based on at least a portion of the adjusted input signal. The demodulator determines at least a first symbol sequence and a second symbol sequence based on the adjusted input signal. The second compensator is operable to adjust the first symbol sequence and the second symbol sequence based on the estimate residual frequency offset.

20 Claims, 1 Drawing Sheet

PHASE ADVANCE COMPENSATION FOR MIMO TIME-SWITCH PREAMBLE MODES

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communications electronics, and more particularly, but not by way of limitation, to a system and method to provide phase advance compensation for MIMO time-switch preamble modes.

BACKGROUND OF THE INVENTION

Wireless communications may be conducted in a challenging environment exhibiting electromagnetic interference and competing wireless signals. Wireless local area networks (WLANs) are becoming more popular as a means of providing a networked office infrastructure. Communication protocols define standardized communication procedures to enable equipment from different vendors to intercommunicate. Communication standards generally evolve constantly as new needs and more powerful electronic technology emerges. Communications circuits may be combined in one or more integrated circuits to achieve desirable price points for consumer electronics. Specialized chips and/or chip sets may be developed by semiconductor manufacturers to support specific communication protocols. As new communication standards or variations of standards are released, new chips and/or chips sets are designed and released for sale.

SUMMARY OF THE INVENTION

The present disclosure, according to one embodiment, provides a communications receiver that includes a first and second compensators, a pilot tracker, and a demodulator. The first compensator is operable to adjust an input signal based on both a coarse frequency offset and a fine frequency offset to produce an adjusted input signal. The pilot tracker determines an estimated residual frequency offset based on at least a portion of the adjusted input signal. The demodulator determines at least a first symbol sequence and a second symbol sequence based on the adjusted input signal. The second compensator is operable to adjust the first symbol sequence and the second symbol sequence based on the estimate residual frequency offset.

In another embodiment, a method for processing a wireless signal is provided. The method includes receiving a first and second training signals, the second training signal offset from the first training signal by a time interval. The method includes determining an estimate of a first channel based on the first training signal, and determining a residual frequency offset. The method includes determining an estimate of a second channel based on the second training signal, on the residual frequency offset, and on the time interval. The method further includes receiving a data signal, and decoding the data signal based in part on the estimate of the first channel and the estimate of the second channel.

An application specific integrated circuit is provided according to another embodiment of the present disclosure. The application specific integrated circuit includes a fast Fourier transformer, a pilot tracker, a demodulator, a first compensator. The fast Fourier transformer is operable to transform an input time domain signal to an input frequency domain signal. The pilot tracker is operable to determine an estimated residual frequency offset based on at least a portion of the input frequency domain signal. The demodulator determines at least a first symbol sequence and a second symbol sequence based on the input frequency domain signal. The first compensator adjusts the first symbol sequence and the second symbol sequence based on the estimated residual frequency offset.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The IEEE-802-11n wireless local area network (WLAN) standard is an emerging WLAN technology that may use multiple transmitters and/or receivers to increase communication channel capacity in a rich scattering environment. WLAN transceivers implementing this technology may be called multiple input multiple output (MIMO) transceivers.

Figure 1:
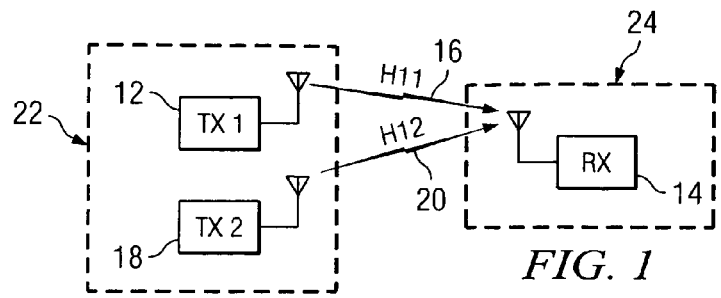
FIG. 1 is a block diagram of a pair of transmitters in communication with a receiver according to an embodiment of the disclosure.

Turning now to FIG. 1, a block diagram depicts an exemplary MIMO communication configuration. A first transmitter 12 is in communication with a receiver 14 via a first channel ($H_{11}$) 16. A second transmitter 18 is in communication with the receiver 14 via a second channel ($H_{12}$) 20. Generally, the channels $Ha_{11}$, $H_{12}$ alter the signal which they convey, and this alteration or distortion may be represented by a transfer function of each channel. Note that $H_{11}$ and $H_{12}$ also may be employed to represent the transfer function of the first channel and of the second channel respectively. In an embodiment, the first transmitter 12 and the second transmitter 18 may be integrated in a single device. In an embodiment, the transmitters 12 and 18 may be part of a transmitter section of a first MIMO transceiver 22 and the receiver 14 may be the receiver section of a second MIMO transceiver 24. In another embodiment, the second MIMO transceiver 24 may include one or more additional receiver stages. In another embodiment, the first MIMO transceiver 22 may have fewer or additional transmitter stages. In another embodiment, the first MIMO transceiver 22 may have additional transmitter stages including more than two antennas.

MIMO receivers may complete a period of training at the beginning of each transmitted packet or block of data to promote reliable communications. During the training period, known and/or unknown signals are transmitted by the first transmitter 12 and the second transmitter 18. The receiver 14 may use these known and/or unknown signals to estimate and set operational parameters to promote reliable communications.

Because the first MIMO transceiver 22 and the second MIMO transceiver 24 do not share a common clock, frequency estimates made by the receiver 14 may disagree with those of the first transmitter 12 and the second transmitter 18. The receiver 14 may use the training period to adjust automatic gain control (AGC). The receiver 14 may also use the training period to estimate a coarse frequency offset $\Delta f_{cfo}$ and a fine frequency offset $\Delta f_{ffo}$ between the frequency of the receiver 14 and the frequency of the first transmitter 12 and the second transmitter 18. In an embodiment, the coarse frequency offset $\Delta f_{cfo}$ and the fine frequency offset $\Delta f_{ffo}$ may be combined as a frequency offset $\Delta f_{fo}$ and the receiver 14 may directly estimate the frequency offset $\Delta f_{fo}$ in one operation. Typically there remains a residual frequency offset (RFO), after both a single operation frequency offset $\Delta f_{fo}$ estimation or a two step coarse frequency offset $\Delta f_{cfo}$ and the fine frequency offset $\Delta f_{ffo}$ estimation, such that the actual transmitted frequency $f_T$ is equal to the sum of the estimated frequency $\hat{f}$ and the several offsets:

$$f_T = \hat{f} + \Delta f_{cfo} + \Delta f_{ffo} + RFO \quad (1)$$

The receiver 14 may use the training period to estimate the transfer functions of the channels $H_{11}$ 16 and $H_{12}$ 20. The receiver 14 may then employ the estimated transfer functions of the channels $H_{11}$ 16 and $H_{12}$ 20 to compensate for the distortion the channels $H_{11}$ 16 and $H_{12}$ 20 induce in the transmitted signals. The estimated transfer function of the first channel $H_{11}$ 16 may be referred to as $\hat{H}_{11}$ and the estimated transfer function of the second channel $H_{12}$ 20 may be referred to as $\hat{H}_{12}$.

In an embodiment, the portion of the training sequence promoting the estimation of the channels $H_{11}$ 16 and $H_{12}$ 20 is segmented and the portion of the training sequence used to determine $\hat{H}_{11}$, is separated by a four symbol time lag from the portion of the training sequence used to determine $\hat{H}_{12}$. In other embodiments, a different symbol lag time may occur. During the first training sequence, for example, the first transmitter 12 may transmit a first portion of the training sequence while the second transmitter 18 remains silent, whereby the receiver 14 may be better able to receive and interpret the first portion of the training sequence. During the second training sequence, for example, the second transmitter 18 may transmit a second portion of the training sequence while the first transmitter 12 remains silent, whereby the receiver 14 may be better able to receive and interpret the second portion of the training sequence.

The four symbol time separation, which may be referred to as a time-switched preamble, in association with the RFO, causes the two channel estimates, $\hat{H}_{11}$ and $\hat{H}_{12}$, to be rotated with respect to one another by four times the phase angle offset $\Psi$, where $\Psi$ is the phase angle offset per symbol associated with the RFO. In communication systems which do not employ a time-switched preamble in training, the two channel estimates $\hat{H}_{11}$ and $\hat{H}_{12}$ are not rotated with respect to each other. The phase angle offset $\Psi$ causes constellations, or quadrature amplitude modulation (QAM) symbols, that are equalized with $\hat{H}_{11}$ to be rotated with respect to constellations equalized with $\hat{H}_{12}$. Due to this constant rotation, some of the constellations may fall outside of demodulation decision boundaries, interfering with the decoding of the QAM symbols and of the receiving of the communicated packet, producing an unacceptable packet error rate in the receiver 14. Additionally, the phase angle offset per symbol $\Psi$ accumulates over time and, uncompensated, leads the receiver 14 to erroneously decode the QAM symbols or constellations. The present disclosure provides a useful circuit and method for providing phase compensation in conjunction with a MIMO time-switched preamble to reduce the packet error rate in the receiver 14 to an acceptable level.

Figure 2:
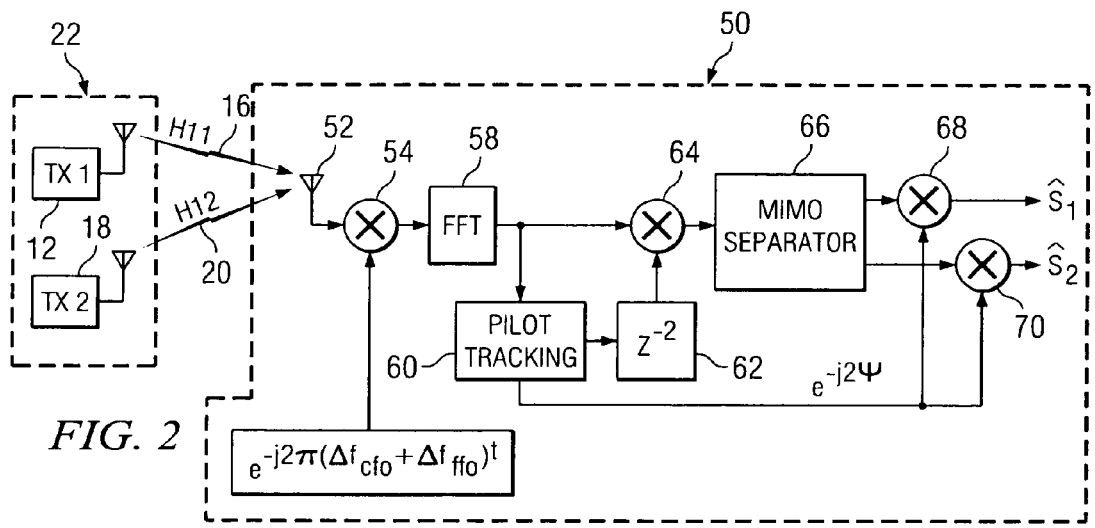
FIG. 2 is a block diagram of a phase compensating receiver according to an embodiment of the disclosure.

Turning now to FIG. 2, a block diagram of a phase compensating receiver 50 is depicted. The phase compensating receiver 50 is operable to compensate for errors that otherwise result from the rotation of the two channel estimates $\hat{H}_{11}$ and $\hat{H}_{12}$ with respect to each other. An antenna 52 receives a MIMO signal from the first transmitter 12 via the $H_{11}$ 16 and from the second transmitter 18 via the $H_{12}$ 20. The MIMO signal may be further processed by various additional circuitry (not shown). In one embodiment, the MIMO signal is at least in part comprised of orthogonal frequency division multiplex (OFDM) symbols conforming with an IEEE-802.11n standard. In other embodiments, the MIMO signal may conform to a different communication standard.

The MIMO signal is adjusted by a frequency shifter 54 to compensate for the coarse frequency offset $\Delta f_{cfo}$ and the fine frequency offset $\Delta f_{ffo}$. The frequency shifter 54 may be referred to as a compensator. A fast Fourier transformer 58 transforms the adjusted MIMO signal to the frequency domain. A pilot tracking component 60 is operable to refine the estimate of RFO and to estimate $\Psi$, the per symbol phase angle offset due to the RFO which is not corrected for by the frequency shifter 54. The estimated $\Psi$ is passed through a two symbol delay component 62 and then the delayed $\Psi$ is used by a first complex derotator component 64 to adjust the frequency domain MIMO signal. The first complex derotator component 64 may be referred to as a compensator. In another embodiment, other delays may be employed. Generally, the delay is half the delay between channel estimates during training.

The pilot tracking component 60 estimates RFO based on a plurality of OFDM pilot tones. Either or both the first transmitter 12 and the second transmitter 18 may transmit the OFDM pilot tones but during different symbol intervals. In an embodiment, the first transmitter 12 may transmit the OFDM pilot tone in a first symbol, and then the second transmitter 18 may transmit the OFDM pilot tone in a second symbol. The pilot tracking component 60 determines, from OFDM symbol to OFDM symbol, the advance in phase of the OFDM pilot tones to estimate RFO. Because of the phase offset between the estimates $\hat{H}_{11}$ and $\hat{H}_{12}$, the OFDM pilot tones compensated with $\hat{H}_{12}$ will have an additional phase rotation from the OFDM pilot tones compensated with $\hat{H}_{11}$, and a pilot phase at the input to the pilot tracking component 60 will appear to jump forward and to fall back as the individual OFDM symbols are processed. The pilot tracking component 60 tends to average this saw tooth behavior out, which is supported by the two symbol delay introduced by the two symbol delay component 62.

A MIMO separator 66 processes the adjusted frequency domain MIMO signal to extract two sequences of data symbols—a first sequence of data symbols $s_1$ transmitted by the first transmitter 12 and a second sequence of data symbols $s_2$ transmitted by the second transmitter 18. In an embodiment, the MIMO separator 66 is a space time transmit diversity (STTD) demodulator. A second derotator component 68 derotates the first sequence of data symbols $s_1$ by two $\Psi$, and a third derotator component 70 derotates the second sequence of data symbols $s_2$ by two $\Psi$. The second derotator component 68 and the third derotator component 70 may be referred to as one or more compensators.

In the case of other MIMO modes, for example a vertical layer space time (VLST) mode, similar compensations may be accomplished desirably with electronic structures similar to those of the phase compensating receiver 50. For example, in the VLST mode, the second derotator component 68 may derotate the first sequence of data symbols $s_1$ by $k\Psi$ and the third derotator component 70 may derotate the second sequence of data symbols $s_2$ by $k\Psi$, where k is an integer greater than two. One skilled in the art may readily extend the analysis employed in defining the embodiment directed to the STTD mode to define other embodiments for other MIMO modes and to embodiments using more than two transmit antennas. To this purpose, the analysis of the STTD mode is disclosed below.

In the STTD mode, encoding and mapping to two transmit antennas is performed as shown in Table 1 below. During OFDM symbol interval 2n, data symbols $s_1(n)$ and $-s_2^*(n)$ are transmitted by the first transmitter 12 and the second transmitter 18 respectively. During the following OFDM symbol interval 2n+1, data symbols $s_2(n)$ and $s_1^*(n)$ are transmitted by the first transmitter 12 and the second transmitter 18 respectively.

TABLE 1

| Data symbol transmissions. | | |
|---|---|---|
| Time | Transmitter 1 | Transmitter 2 |
| 2n | $s_1(n)$ | $-s_2^*(n)$ |
| 2n + 1 | $s_2(n)$ | $s_1^*(n)$ |

The coarse and fine frequency offsets, $\Delta f_{CFO}$ and $\Delta f_{FFO}$, are removed from the received signal by the frequency shifter 54 before processing by the fast Fourier transformer 58, and any RFO is corrected after processing by the fast Fourier transformer 58. The outputs of the fast Fourier transformer 58 may be represented as:

$$y(2n) = (H_{11}s_1(n) - H_{12}s_2^*(n))e^{j2n\Psi} \quad (2)$$

$$y(2n+1) = (H_{11}s_2(n) + H_{12}s_1^*(n))e^{j(2n+1)\Psi} \quad (3)$$

The STTD method for recovering the transmitted data symbols $s_1$ and $s_2$ from the received signals $y(2n)$ and $y(2n+1)$ is given by the following equations:

$$\hat{s}_1(n) = \frac{\hat{H}_{11}^* y_1(2n) + \hat{H}_{12} y_1^*(2n+1)}{H_{11}^* H_{11} + H_{12}^* H_{12}} \quad (4)$$

$$\hat{s}_2(n) = \frac{\hat{H}_{11}^* y_1(2n+1) - \hat{H}_{12} y_1^*(2n)}{H_{11}^* H_{11} + H_{12}^* H_{12}} \quad (5)$$

As discussed above, because $H_{12}$ is estimated four symbols after $H_{11}$ is estimated, the RFO leads to the phase between the two channel estimates $\hat{H}_{11}$ and $\hat{H}_{12}$ advancing by $4\Psi$ where $\Psi$ is the phase advance in one symbol period due to the RFO. If the channel estimates are assumed to be perfect except for the phase advance then the estimates can be represented as:

$$\hat{H}_{11} = H_{11} \quad (6)$$

$$\hat{H}_{12} = H_{12} e^{j4\Psi} \quad (7)$$

Substituting these channel estimates into equation (4) and equation (5) yields:

$$\hat{s}_1(n) = \frac{H_{11}^* y_1(2n) + H_{12} e^{j4\Psi} y_1^*(2n+1)}{H_{11}^* H_{11} + H_{12}^* H_{12}} \quad (8)$$

$$\hat{s}_2(n) = \frac{H_{11}^* y_1(2n+1) - H_{12} e^{j4\Psi} y_1^*(2n)}{H_{11}^* H_{11} + H_{12}^* H_{12}} \quad (9)$$

To determine how to compensate the received signals for RFO as well as the $4\Psi$ phase advance between channel estimates, multiply $y(2)$ by $e^{-jb\Psi}$ and $y(2n+1)$ by $e^{-jc\Psi}$, where b and c are to be determined. Equations (2) and (3) then become:

$$y(2n) = (H_{11}s_1(n) - H_{12}s_2^*(n))e^{j(2n-b)\Psi} \quad (10)$$

$$y(2n+1) = (H_{11}s_2(n) + H_{12}s_1^*(n))e^{j(2n+1-c)\Psi} \quad (11)$$

Substituting equations (10) and (11) into equations (8) and (9) and rearranging yields:

$$\hat{s}_1(n) = \frac{s_1(n)[H_{11}^* H_{11} e^{j(2n-b)\Psi} + H_{12}^* H_{12} e^{-j(2n+1-c-4)\Psi}]}{H_{11}^* H_{11} + H_{12}^* H_{12}} + \frac{s_2^*(n)[H_{11}^* H_{12} e^{-j(2n+1-c-4)\Psi} - H_{11}^* H_{12} e^{j(2n-b)\Psi}]}{H_{11}^* H_{11} + H_{12}^* H_{12}} \quad (12)$$

$$\hat{s}_2(n) = \frac{s_1^*(n)[H_{11}^* H_{12} e^{j(2n+1-c)\Psi} - H_{11}^* H_{12} e^{-j(2n-b-4)\Psi}]}{H_{11}^* H_{11} + H_{12}^* H_{12}} + \frac{s_2(n)[H_{11}^* H_{11} e^{j(2n+1-c)\Psi} + H_{12}^* H_{12} e^{-j(2n-b-4)\Psi}]}{H_{11}^* H_{11} + H_{12}^* H_{12}} \quad (13)$$

Ordinarily the RFO correction would lead to the selection of b=2n and c=2n+1, however, for the estimates to be correct the second term in $\hat{s}_1$ and the first term in $\hat{s}_2$ desirably vanish. If the indices are retarded two symbol periods so that b=2n-2 and m=2n-1, then the expressions in equations (12) and (13) become:

$$\hat{s}_1(n) = s_1(n) e^{j2\Psi} \quad (14)$$

$$\hat{s}_2(n) = s_2(n) e^{j2\Psi} \quad (15)$$

Thus, to recover the transmitted information, $\hat{s}_1$ and $\hat{s}_2$ are derotated at the outputs of the MIMO separator 66 by $2\Psi$. Note that the factor of 2 is related to the delay between channel estimates during training and may vary with different delays between channel estimates during training.

Figure 3:
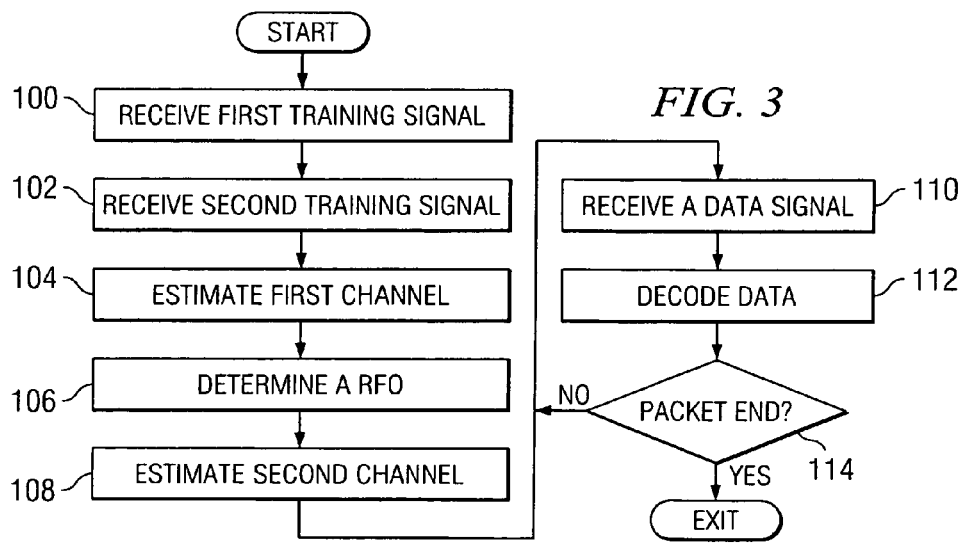
FIG. 3 is a flow diagram of a process for phase compensating a received signal according to an embodiment of the disclosure.

Turning now to FIG. 3, a logic diagram depicts a method for determining estimates of the channel transfer functions, $\hat{H}_{11}$ and $\hat{H}_{12}$, and using the channel transfer functions to decode data signals. In block 100, a first training signal is received, for example from the first transmitter 12. The method proceeds to block 102, where a second training signal is received, for example from the second transmitter 18. In the present embodiment, a period of time passes after the processing of block 100 completes and before the processing of block 102 begins.

The method proceeds to block 104 where the transfer function of the first channel, $H_{11}$, is estimated as $\hat{H}_{11}$ based on the first training signal. The method proceeds to block 106 where a RFO is determined. Note that RFO continues to be refined and determined later, during data communication. The method proceeds to block 108 where the transfer function of the second channel, $H_{12}$, is estimated as $\hat{H}_{12}$, based on the second training signal, on the RFO, and on the period of time that passed between the first training signal and the second training signal. The determining $\hat{H}_{11}$ and $\hat{H}_{12}$ is performed once during the initialization of a communication interchange. In an embodiment, the processing associated with estimating the determining $\hat{H}_{11}$ and $\hat{H}_{12}$ is performed by fetching instructions from a random access memory and executing the instructions in a general purpose processor or processor portion of an ASIC.

The method proceeds to block 110 where a data signal is received. In an embodiment, the data signal may be a portion of an IEEE-802.11n signal and the data signal may be an OFDM symbol. The method proceeds to block 112 where the data is decoded. In an embodiment, an OFDM symbol is decoded. The method proceeds to block 114 where if the data packet has not completed, the method returns to block 110, otherwise the method exits.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A communications receiver, comprising:
   a first compensator operable to adjust an input signal based on a coarse frequency offset and a fine frequency offset to produce an adjusted input signal;
   a pilot tracker operable to determine an estimated residual frequency offset based on at least a portion of the adjusted input signal;
   a demodulator operable to determine at least a first symbol sequence and a second symbol sequence based on the adjusted input signal; and
   a second compensator operable to adjust the first symbol sequence and the second symbol sequence based on the estimate residual frequency offset.

2. The communications receiver of claim 1, wherein the input signal is an orthogonal frequency division multiplex signal.

3. The communications receiver of claim 1, wherein the demodulator is a multiple input multiple output demodulator.

4. The communications receiver of claim 1, wherein the demodulator is a space time transmit diversity mode demodulator.

5. The communications receiver of claim 4, wherein the second compensator is operable to derotate the first symbol sequence and the second symbol sequence by two times a per symbol phase angle associated with the residual frequency offset.

6. The communications receiver of claim 1, wherein the demodulator is a vertical layer space time mode demodulator.

7. The communications receiver of claim 1, further including:
   a third compensator operable to further adjust the adjusted input signal based on the residual frequency offset delayed by two symbol periods.

8. The communications receiver of claim 7, further including:
   a fast Fourier transformer operable to transform the adjusted input signal into a frequency domain adjusted input signal, wherein the pilot tracker and the third compensator are coupled to the frequency domain adjusted input signal.

9. A method for processing a wireless signal, comprising:
   receiving a first training signal;
   receiving a second training signal, the second training signal offset from the first training signal by a time interval;
   determining an estimate of a first channel based on the first training signal;
   determining a residual frequency offset;
   determining an estimate of a second channel based on the second training signal, on the residual frequency offset, and on the time interval;
   receiving a data signal; and
   decoding the data signal based in part on the estimate of the first channel and the estimate of the second channel.

10. The method of claim 9, wherein the decoding is accomplished using a multiple input multiple output demodulator.

11. The method of claim 9, wherein the data signal is an orthogonal frequency division multiplex signal.

12. The method of claim 9, further including:
    determining a coarse frequency offset; and
    determining a fine frequency offset, wherein the determining the residual frequency offset is based in part on the coarse frequency offset and the fine frequency offset and the decoding the data signal is further based on the coarse frequency offset and the fine frequency offset.

13. An application specific integrated circuit, comprising:
    a fast Fourier transformer operable to transform an input time domain signal to an input frequency domain signal;
    a pilot tracker operable to determine an estimated residual frequency offset based on at least a portion of the input frequency domain signal;
    a demodulator operable to determine at least a first symbol sequence and a second symbol sequence based on the input frequency domain signal; and a first compensator operable to adjust the first symbol sequence and the second symbol sequence based on the estimated residual frequency offset.

14. The application specific integrated circuit of claim 13, wherein the input time domain signal is an orthogonal frequency division multiplex signal.

15. The application specific integrated circuit of claim 13, wherein the demodulator is a multiple input multiple output demodulator.

16. The application specific integrated circuit of claim 13, wherein the demodulator is a space time transmit diversity mode demodulator.

17. The application specific integrated circuit of claim 16, wherein the first compensator is operable to derotate the first symbol sequence and the second symbol sequence by two times a per symbol phase angle associated with the residual frequency offset.

18. The application specific integrated circuit of claim 13, further including a second compensator, implemented in gates, operable to adjust the input frequency domain signal based on the residual frequency offset delayed two symbol periods.

19. The application specific integrated circuit of claim 18, further including a third compensator operable to adjust the input time domain signal based on a coarse frequency offset and a fine frequency offset.

20. The application specific integrated circuit of claim 13, wherein the fast Fourier transformer, the pilot tracker, the demodulator, and the first compensator are at least a portion of a multiple input multiple output transceiver.

* * * * *